Oct. 24, 1933.  E. G. ROEHM  1,932,377
MILLING MACHINE
Filed May 17, 1930  5 Sheets-Sheet 1

Inventor
ERWIN G. ROEHM
By A. H. Parsons
Attorney

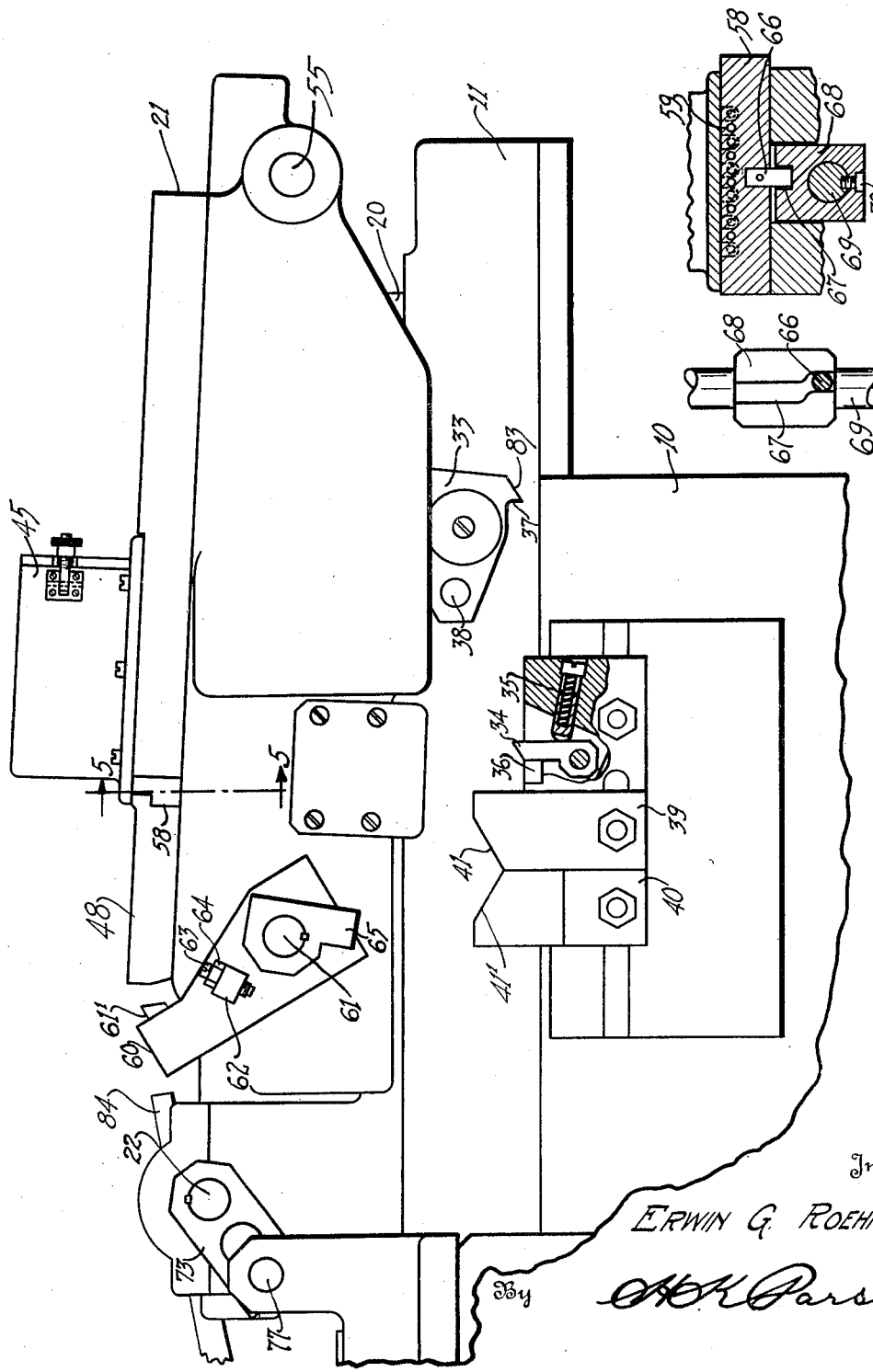

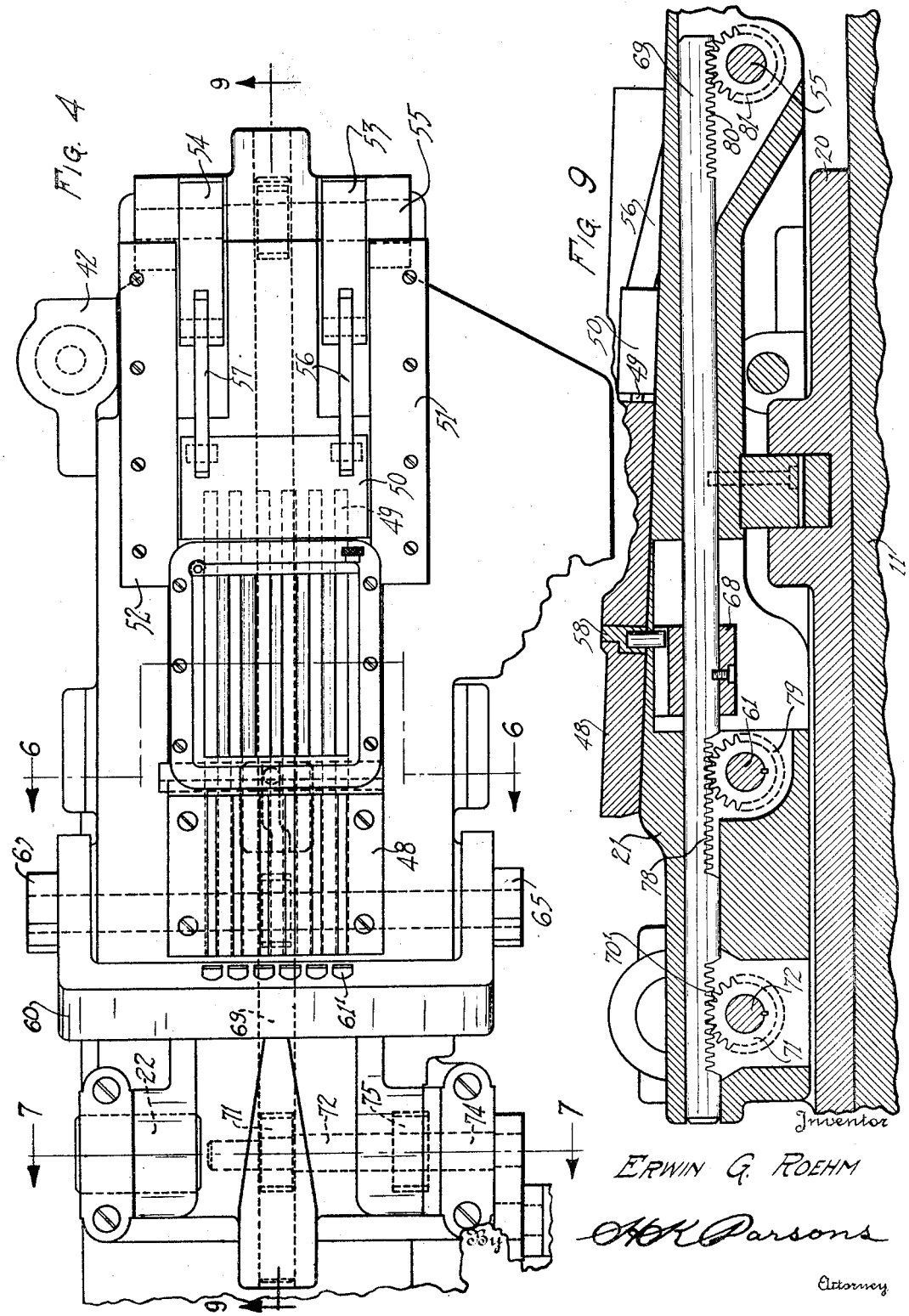

Oct. 24, 1933.  E. G. ROEHM  1,932,377
MILLING MACHINE
Filed May 17, 1930   5 Sheets-Sheet 4
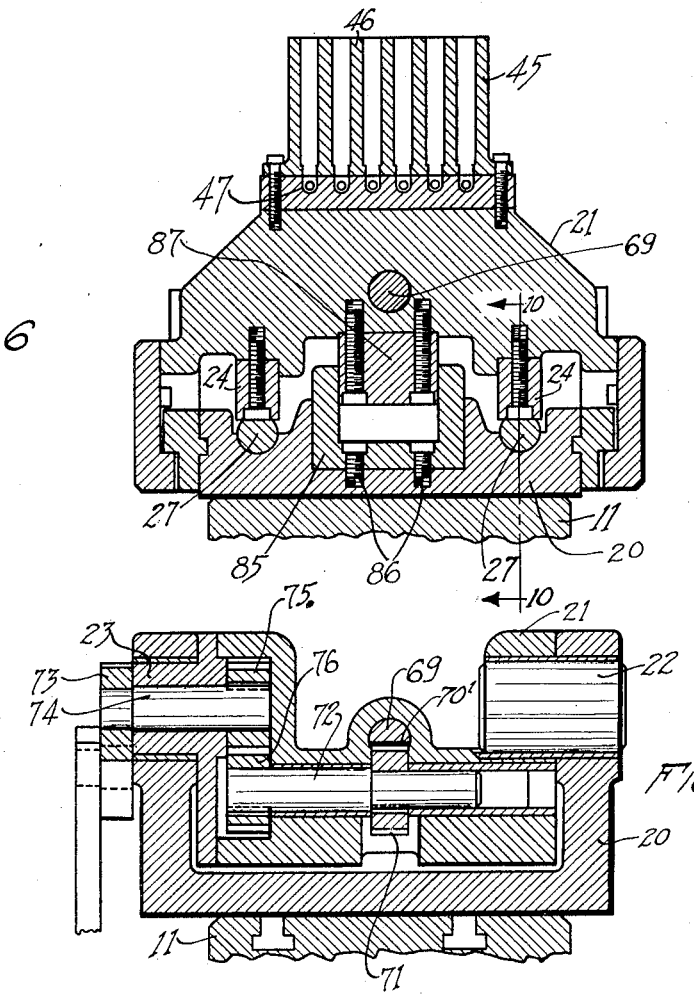
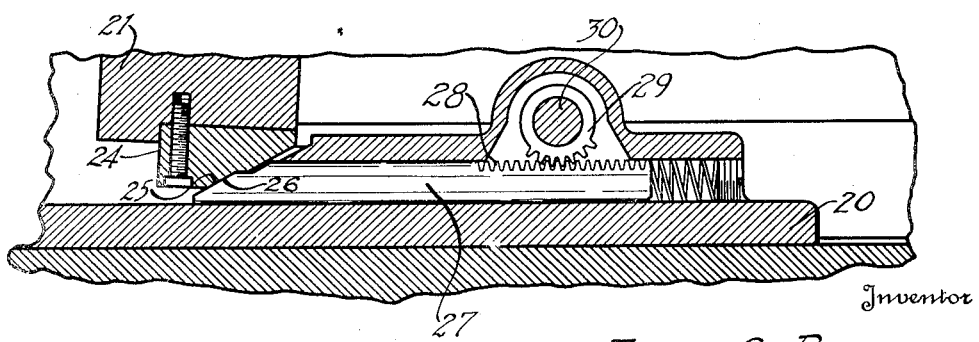
Inventor
ERWIN G. ROEHM
By AHKParsons
Attorney Patented Oct. 24, 1933

1,932,377

UNITED STATES PATENT OFFICE 1,932,377

MILLING MACHINE

Erwin G. Roehm, Norwood, Ohio, assignor to The Cincinnati Milling Machine Company, Cincinnati, Ohio, a corporation of Ohio Application May 17, 1930. Serial No. 453,379

12 Claims. (Cl. 90—11)

This invention relates to milling machines and more particularly to automatic machines for milling a plurality of similar work pieces simultaneously.

An object of this invention is the provision of a milling machine for operating simultaneously upon a plurality of work pieces in which the work is placed in cutting position and removed therefrom automatically thereby reducing supervision of the machine to a minimum and making it possible for a single attendant to operate several of these machines.

Another object of this invention is the provision of a fully automatic milling machine having a magazine or hopper from which unfinished work pieces are automatically placed in cutting position, subjected to the action of the cutter and ejected from the machine in a continuous cycle.

A further object of this invention is the provision of an improved drop table mechanism that is adapted to raise work into engagement with a cutter and lower work out of engagement therewith in timed relation with the reciprocation of the work support to effect a longitudinal cut of predetermined length in the work piece.

Other objects and advantages of the present invention should be readily apparent by reference to the following specification considered in conjunction with the accompanying drawings illustrative of one embodiment thereof but it will be understood that any modifications may be made in the specific structural details hereinafter disclosed within the scope of the appended claims without departing from or exceeding the spirit of the invention.

Referring to the drawings, in which like reference numerals indicate like parts—

Figure 3 is an enlarged detail view of the work holding fixture in returned position.

Figure 4 is a plan view of the work fixture shown in Figure 3.

Figure 5 is a section on the line 5—5 of Figure 3.

Figure 6 is a section on the line 6—6 of Figure 4.

Figure 7 is a section on the line 7—7 of Figure 4.

Figure 9 is a section on the line 9—9 of Figure 4.

Figure 10 is a section on the line 10—10 of Figure 6.

Figure 11 is a plan view of the cam shown in Figure 5.

Figure 1:
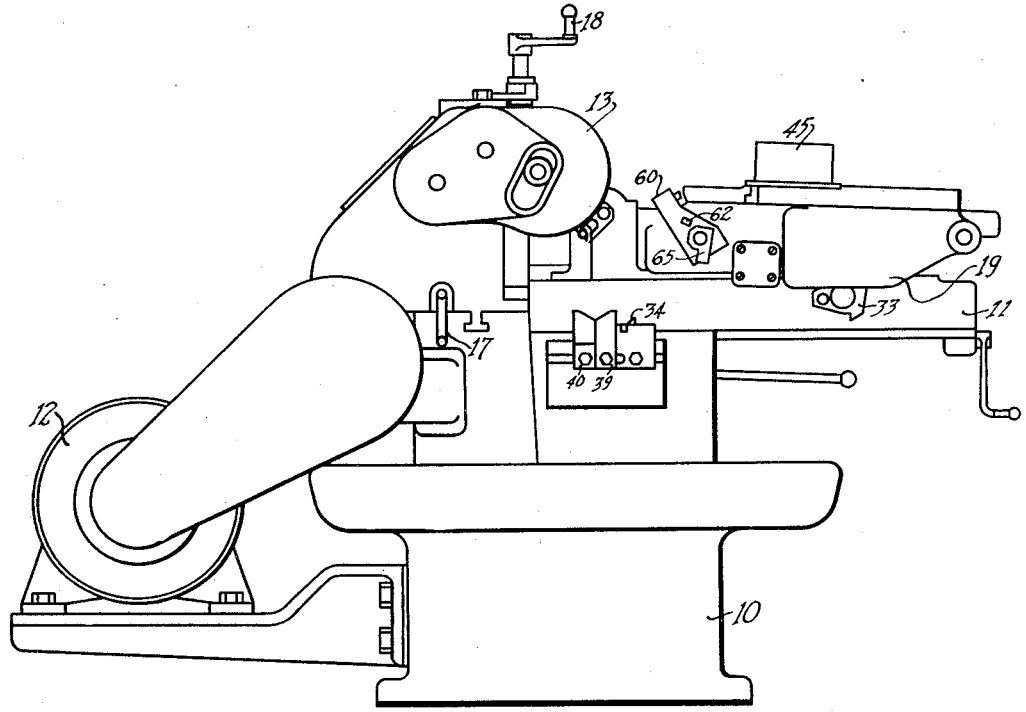
Figure 1 is a side elevation of a milling machine showing one embodiment of the invention.

In the drawings the reference numeral 10 indicates the base of the machine upon which is reciprocably supported the slide 11 which may be driven by a prime mover 12 in any suitable manner. A cutter spindle head 13 is mounted upon an upstanding portion of the bed for rotatably supporting the cutter spindle 14 which actuates the cutter arbor 15 having a plurality of cutters 16 carried thereby. The cutter head 13 is adjustable laterally of the work table by means of the handle 17 and vertically adjustable by means of the handle 18.

Mounted upon the work table 11 is the work fixture indicated generally by the reference numeral 19. This fixture comprises a base portion 20 which is fixed to the table and a pivoted work support portion 21 forming a drop table arrangement whereby the work pieces may be moved toward and from the cutters at predetermined times during operation of the machine to effect a cut in the work piece of desired length.

The work support 21 is pivotally mounted on the base portion 20 by means of pivot pins 22 and 23 as shown in Figure 7.

In order to raise and lower the work, spaced cam members 24 are attached to the under side of the work support 21 having angular cam surfaces 25 which are engaged by the angular surfaces 26 of the reciprocable members 27. These members have rack teeth 28 engaging the pinion 29 mounted upon the horizontal shaft 30 which has the actuating gear 31 fixed upon one end thereof meshing with the segmental gear portion 32 of the pivoted member 33.

Figure 8:
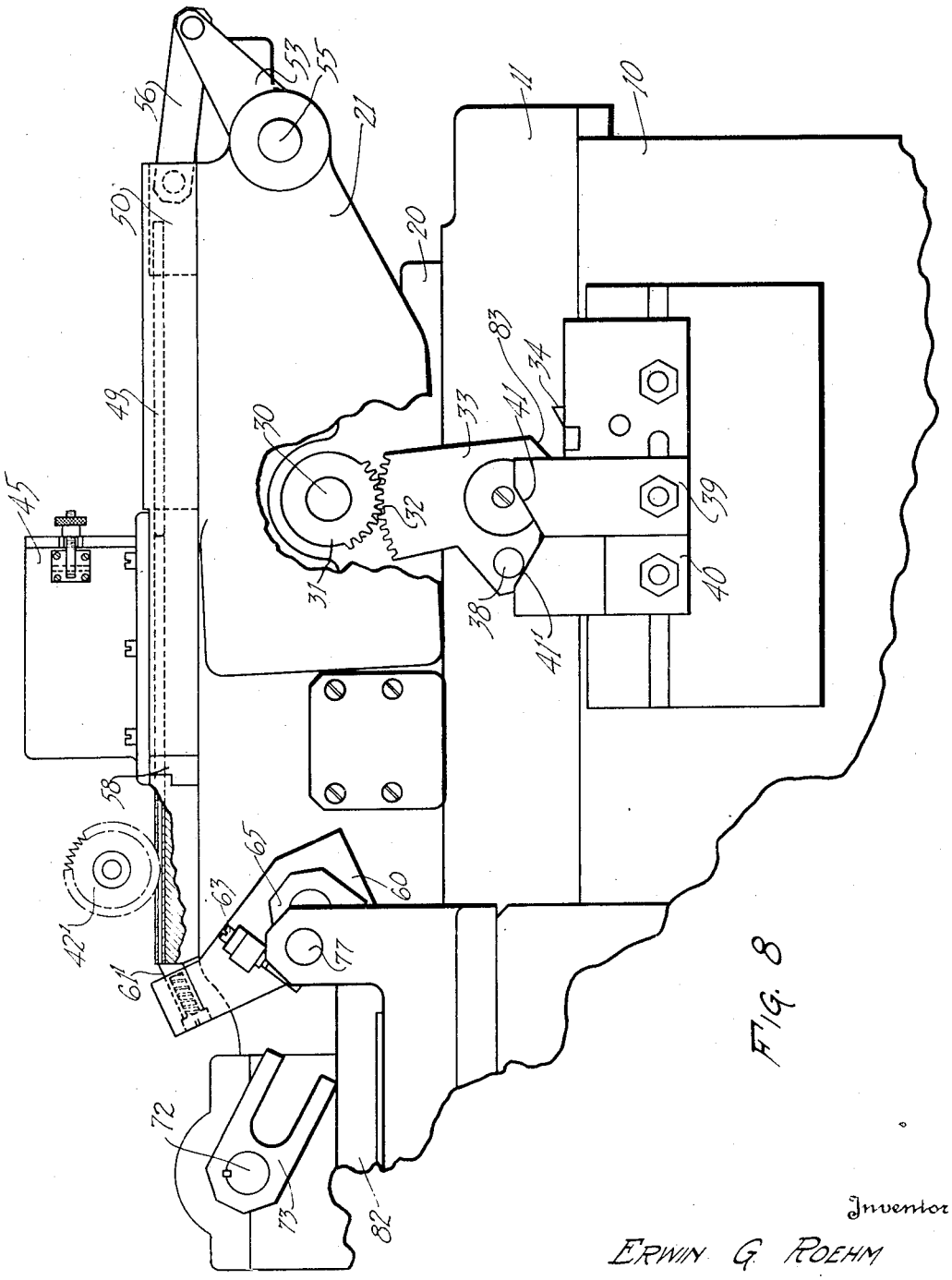
Figure 8 is an elevation of the work fixture shown in raised position.

Fixed upon the base portion 10 adjacent the side of the work table is the latch dog 34 having the spring pressed plunger 35 for holding it into engagement with the fixed abutment 36. The vertical face of this dog is adapted upon reciprocation of the work table to the left as shown in Figure 3 to engage the vertical face 37 of the member 33 to rotate it thereby causing longitudinal movement of the members 27 to raise the work fixture 21 into horizontal cutting position. When this movement has been completed, as shown in Figure 8, the pin 38 fixed with the member 33 will be positioned between the sides of the V formed by the members 39 and 40 attached to the fixed part of the machine. Upon continued forward movement of the table the pin 38 will engage the inclined surface 41' rotating the member 33 in a clockwise direction thereby causing the table to drop and moving the work out of engagement with the cutter 42'. It is preferable that the reversal of the table 11 take place at the same time that the drop table 21 is lowered, and since well known reversing dogs may be set to accomplish this purpose further description thereof is not deemed necessary.

Figure 2:
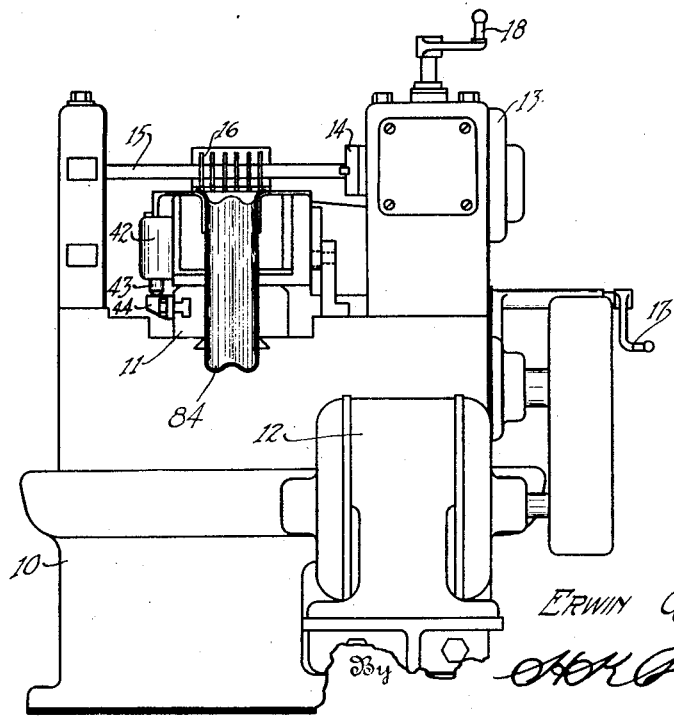
Figure 2 is an end elevation of the machine.

If for some reason the drop table mechanism fails to trip on the forward stroke, the other leg 41 of the V will engage the pin 38 upon the return stroke, thus insuring that the cutters will be moved out of engagement with the work before the work inserting and ejecting mechanism commences to operate. On account of the weight of the drop table, the tendency is for it to drop sharply and in order to ease this movement a dash pot 42, shown more particularly in Figure 2, is attached to the opposite side of the table 21 having a plunger 43 engaging an abutment member 44 fixed to the work table 11. From the foregoing it will be seen that mechanism has been provided which will raise the work table into cutting position upon reciprocation of the slide toward the cutter, and for lowering the work table when the cut is completed and just before reversal of the slide.

To insure movement of the table 21 in a vertical line as well as prevent lateral play thereof, a U-shaped guide 85 is let into the fixed portion 20 of the fixture as shown in Figure 6 and fixed thereto as by the screws 86. A guide block 87 is secured to the underside of the drop table 21 having a close sliding fit in guide 85. The length of the guide surfaces is sufficient to insure true vertical movement of the table and at the same time prevent any lateral movement thereof.

A magazine or hopper is provided upon the drop table 21 for storing the unfinished work pieces and in this instance the hopper is provided with a plurality of partitions 46 dividing the interior thereof into a plurality of narrow vertical spaces so that work pieces placed therein will not become cramped or jammed. A plurality of parallel longitudinal grooves 47 are formed in the bottom of the hopper and of such width as to receive only one work piece at a time. These grooves are continued into the work holder platen 48 and in order to move the work pieces from the bottom of the hopper to the platen 48 a plurality of pins or fingers 49 are mounted for reciprocation, each in a separate groove, for pushing the work pieces from the bottom of the hopper on to the platen. The pins 49 are secured in a reciprocating block 50 slidable between the guide members 51 and 52. A pair of arms 53 and 54, fixed to a rotatable shaft 55, are provided for actuating the block 50 and are connected thereto by the links 56 and 57 which are pivoted at opposite ends to the block and crank arms respectively. After the work pieces have been moved on to the plate 48 they are clamped into position by end pressure. This may be effected by a slidable shutter member 58 having a plurality of holes 59 formed therein which have the same spacing as the grooves 47 so that upon movement to the left in Figure 5 the holes will register with the grooves to permit passage of the work pieces through the holes and upon movement to the position as shown will form a stoppage or abutment against which the work pieces may be clamped. The work pieces are forced against this abutting member by the work clamping member 60 which is in the form of a yoke mounted upon the shaft 61 for free rotation thereabout. The member 60 has a plurality of spring pressed clamping plungers 61', there being one for each groove. In order to effect rotation of the clamping member a lug 62 is provided on the side thereof having the set screw 80 63 threaded therein and a lock nut 64. An actuating arm 65 is keyed to the shaft 61 having a lost motion connection with the end of the set screw 63. This makes it possible to adjust the timing of the parts with greater facility. Upon rotation of the shaft 61, by means to be described later, the arm 65 will pick up the clamping member 60 at the proper time by engagement with the end of the set screw 63 and rotate it into work clamping position, each plunger 61' engaging the end of a work piece and moving it longitudinally in its groove into terminal engagement with the shutter member 58, the spring behind the plunger allowing for any slight variation in the length of the work pieces and insuring that all will be firmly clamped in position for operation thereupon by the cutter gang.

The member 58 is reciprocated back and forth by means of a pin 66 fixed therein engaging a cam slot 67 formed in the reciprocable cam member 68 fixed to the actuating member 69 as by the set screw 70.

The members 61, 68 and 55 are operated in proper timed relation by the single member 69 which has the rack portion 70' engaging the pinion 71 fixed upon the shaft 72 journaled in the end of the member 21 as shown in Figure 7 and adapted to be operated by the bifurcated arm 73, keyed to the shaft 74, through pinion gears 75 and 76. The arm 73 engages the pin 77 mounted on the fixed part of the machine so that upon movement of the table in one direction the member 69 will be moved in the opposite direction.

The member 69 is reciprocably mounted in the interior of the drop table 21, as shown in Figure 9, and has rack teeth 78 meshing with the pinion 79 fixed to the shaft 61 for operating the work clamping arm 65 and the rack portion 80 engaging the pinion 81 fixed to the shaft 55 for operating the work inserting mechanism. As previously described the member 69 also has fixed thereto the cam member 68 for operating the shutter member 58. Thus a single member has been provided for actuating these parts which is controlled by the arm 73 engaging the fixed pin 77 at proper times during reciprocation of the table.

During movement of the table forward on its cutting stroke, the forked arm 73 after being rotated from the position shown in Figure 3 to the position shown in Figure 8 will disengage from the pin 77 and to insure that the arm will not be accidentally moved from that position so as to be unable to embrace the pin on the return movement of the table, a guide plate 82 is provided which is attached to a fixed part of the machine for the arm to ride on after it disengages the pin.

The operation of the machine is best understood by reference to Figures 3 and 8. For illustrative purposes it may be assumed that the machine is milling longitudinal slots in tubular work pieces. In the present illustration the slots are sunk in the central portion of the pieces and do not run out at the ends. The slide 11 is shown in its returned position in Figure 3 and the fingers 49 have each moved a work piece from the bottom of the hopper forward onto the work supporting platen 48. The slide 11 then moves forward causing rotation of the arm 73 by its engagement with the pin 77. This causes rearward movement of the operating member 69 which in turn reciprocates the shutter 58 to its position shown in Figure 5 forming a clamping abutment at the end of each groove in the platen. The arm 65 then picks up the clamping member 60 and moves it into engagement with the ends of the work pieces to clamp them by end pressure. At the same time the rack portion 80 of the member 69 has been effecting rotation of the shaft 55 to cause the crank arms 53 to withdraw the fingers 49 from the hopper to the position shown in Figure 8. These fingers are withdrawn far enough to allow a new work piece to drop down into each of the grooves formed in the bottom of the hopper ready to be moved into cutting position on the next cycle of the machine.

At the completion of these movements the arm 73 will be rotated to a position where it will disengage from the pin 77, and the parts operated thereby will remain at rest until the return movement of the slide. The slide 11 will continue to move forward to a position where the cutters are in proper position with respect to the work to commence cutting. At this point the face 37 of the arm 33 will engage the trip 34 and be rotated to the position shown in Figure 8. This will raise the work on the table 48 into engagement with the cutter gang. The slide then continues to move the work with respect to the cutters to mill the desired length of slot in the work pieces after which the pin 38 will engage the face 41' of the V to drop the table and thereby the work out of engagement with the cutters. The slide will then reverse its movement, the bevel face 83 riding over the latch dog 34 without effect. Upon return of the slide the arm 73 will embrace the pin 77 causing reverse movement in the operating member 69 to thereby release the clamping arm 60 and move the holes in the shutter 58 into alignment with the grooves. The fingers 49 will move forward to push new work pieces from the bottom of the hopper into cutting position and as these work pieces move forward they will push the finished work pieces ahead of them off the table 48 into the chute 84 and out of the machine.

Thus a machine has been provided which has a storage for unfinished work pieces, from which they are placed in cutting position, operated upon by the milling cutters, and ejected from the machine in continuous automatic cycles.

What is claimed is:

1. A milling machine having a reciprocating slide and a plurality of cutters adjacent thereto, a magazine carried by the slide having individual guide-ways for a plurality of work pieces, a work supporting platen, grooves formed therein aligned with said guide-ways and means for sliding work pieces therein from the magazine to the platen for operation thereupon by the cutters, and means engageable with opposite ends of the work pieces for holding the same against movement during the cutting operation.

2. A milling machine having a reciprocating support, a drop table pivoted thereto, means to oscillate the table to and from a cutting position including relatively movable cam members, one of which is attached to said table, an oscillatable arm operatively connected to the other member, a latch dog mechanism for actuating the arm to move the table to its cutting position, and cam means cooperating with a pin on said arm to cause a reverse movement of the table.

3. A milling machine having a work support, a plurality of work receiving channels formed therein, a transverse shutter adapted in one position to form an abutment in said channels, means to move the shutter to permit passage of work along the channels from one side of the shutter to the other, and means to clamp the work against said shutter by end pressure after passing therethrough.

4. A milling machine having a platen, a plurality of work holding grooves formed therein, a shutter member transversely intercepting said grooves, a magazine in superimposed relation to the portion of the grooves on one side of the member, said shutter having openings therein to permit passage of work pieces therethrough from the magazine, means to shift the shutter member to form an abutment in said grooves and a yoke member pivoted to the platen having a plurality of yieldable plungers for clamping the work by end pressure against said abutment.

5. A milling machine having a grooved work support, a shiftable member transversely intercepting the grooves in the support to form an abutment therein, means to clamp work in the grooves against the abutment for a milling operation, a magazine adjacent one end of the support, a plurality of openings in the member, means to shift the member and effect registry of the openings with the grooves to thereby permit passage of the work from the magazine to the support, a gravity chute adjacent the opposite end of the support, and means to introduce unfinished work into the grooves from the magazine and simultaneously eject the finished work therefrom into the chute by terminal engagement therewith.

6. A milling machine comprising a support and a reciprocating slide thereon, a drop table pivoted to said slide having a work magazine mounted thereon, a cutter arbor journaled in the support in cooperative relation to said table, a work supporting platen formed on the table, means to feed work from the magazine to the platen, work clamping means associated therewith, an oscillatable member carried by the slide, a rack bar connection between the member and both of said means, and a trip device on the support cooperating with the member upon reciprocation of the table in one direction to effect clamping of the work and upon movement in the opposite direction to release the clamping means and actuate the feed mechanism.

7. A milling machine comprising a support and a reciprocating slide therein, a drop table pivoted to said slide having a work magazine mounted thereon, a cutter arbor journaled in the support in cooperative relation to said table, a work supporting platen formed on the table, cam means for raising and lowering the drop table, an oscillating arm, a rack bar connection between the arm and said cam means, means to feed work from the magazine to the platen, work clamping means associated therewith, a second oscillatable arm carried by the slide, a rack bar connection between the arm and said feeding and clamping means and individual trip devices on the support cooperating with each oscillatable arm upon reciprocation of the slide.

8. A milling machine having a reciprocating slide, a plurality of cutters adjacent thereto, a drop table mounted on the slide having a work magazine attached thereto, a plurality of pusher rods mounted in a sliding block guided by the table, means actuated upon return movement of the slide to reciprocate the block and thereby move a plurality of work pieces from the magazine to a cutting position on the table, terminal clamping means actuable upon forward movement of the slide to hold the work pieces in cutting position, trip actuated cam means for raising the table when in predetermined longitudinal position with respect to the cutters to cause engagement thereof with the work, means to subsequently trip said cam means prior to reversing of the table to cause disengagement of the cutters whereby a slot of predetermined length will be cut in each work piece and automatic means to release the work holding means upon return movement of the slide and prior to the actuation of said pusher rods.

9. A milling machine having a reciprocating slide, a plurality of cutters adjacent thereto, a drop table mounted on the slide having a magazine attached thereto, a plurality of pusher rods mounted in a sliding block guided on the table for feeding work from the magazine to work holders on the table, an intermittently reciprocable rack bar for actuating the feeding and work holding devices, dog means operative upon the rack bar during return movement of the slide to cause feeding of the work and during forward movement toward the cutters to effect clamping of the work, trip actuated cam means for raising the cable upon continued forward movement of the slide to effect engagement between the cutter and work, means to trip said cam means after predetermined engagement of the cutters whereby a slot of desired length will be cut in the work pieces and means to actuate the rack bar to effect releasing of the work pieces prior to the work feeding operation.

10. A milling machine having a plurality of rotatable cutters, a work support mounted for reciprocation relative to the cutters, a magazine mounted on said support for storing longitudinal unfinished work pieces, means on the support for positioning said work pieces in predetermined parallel relation to the cutters, means including a plurality of fingers for transferring work from the magazine to the work positioning means, the transferring mechanism being automatically actuated upon retraction of the work support from the cutters, individual work clamping means and a common actuator for the clamping means operable during the advance movement of the work support.

11. A milling machine having a rotatable cutter, a work support, a work holder on the support adapted to receive and position an unfinished longitudinal work piece in the plane of the cutter, whereby upon relative movement between the cutter and work a finished surface may be formed on the side of the work piece throughout its length, means to engage automatically the ends of the work piece to hold the same against longitudinal movement during the cutting operation, said means including an oscillatable member, means to move the member to an inoperative position to permit ejection of the work from the holder and means to automatically effect said ejection.

12. A milling machine having a rotatable cutter and a work support movable relatively to one another, a work receiving groove formed in the work support whereby a longitudinal work piece may be supported throughout its length while exposing one side to the cutter, means to engage opposite ends of the work while supported in the groove to prevent axial movement thereof during contact with the cutter, and means to release the work and eject the same from the groove automatically upon relative retraction between the cutter and work support.

ERWIN G. ROEHM.